United States Patent
Tilley et al.

(10) Patent No.: US 9,016,284 B2
(45) Date of Patent: Apr. 28, 2015

(54) SHEET MATERIAL CUTTING APPARATUS

(75) Inventors: Timothy Franklin Tilley, Pinnacle, NC (US); James Phillip Hollandsworth, Rural Hall, NC (US); Terry Leonard Bullins, Walnut Cove, NC (US); Mark Allen Vernon, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 1321 days.

(21) Appl. No.: 12/608,407

(22) Filed: Oct. 29, 2009

(65) Prior Publication Data

US 2011/0100383 A1 May 5, 2011

(51) Int. Cl.
| | |
|---|---|
| *A24C 5/32* | (2006.01) |
| *A24C 5/34* | (2006.01) |
| *B26D 1/00* | (2006.01) |
| *B02C 18/14* | (2006.01) |
| *B02C 18/18* | (2006.01) |

(52) U.S. Cl.
CPC ............ *B26D 1/0006* (2013.01); *B02C 18/145* (2013.01); *B02C 18/18* (2013.01); *B02C 2018/188* (2013.01); *B26D 1/00* (2013.01); *B26D 2001/0033* (2013.01)

(58) Field of Classification Search
None
See application file for complete search history.

(56) References Cited

U.S. PATENT DOCUMENTS

| | | | |
|---|---|---|---|
| 3,320,991 A | 5/1967 | Molins | |
| 3,322,175 A | 5/1967 | Ward | |
| 3,847,164 A | 11/1974 | Mattina | |
| 4,131,117 A | 12/1978 | Kite et al. | |
| 4,182,349 A | 1/1980 | Selke | |
| 4,308,877 A | 1/1982 | Mattina | |
| 4,341,228 A | 7/1982 | Keritsis | |
| 4,421,126 A | 12/1983 | Gellatly | |
| 4,449,540 A | 5/1984 | Marshall et al. | |
| 4,566,470 A | 1/1986 | Brackman | |
| 4,706,692 A | 11/1987 | Gellatly | |
| 4,941,484 A | 7/1990 | Clapp et al. | |
| 4,962,774 A | 10/1990 | Thomasson et al. | |
| 4,987,906 A | 1/1991 | Young et al. | |
| 5,025,814 A | 6/1991 | Raker | |
| 5,056,537 A | 10/1991 | Brown et al. | |
| 5,143,097 A | 9/1992 | Sohn et al. | |
| 5,322,076 A | 6/1994 | Brinkley et al. | |
| 5,325,877 A | 7/1994 | Young et al. | |
| 5,377,698 A | 1/1995 | Litzinger | |
| 5,445,054 A | 8/1995 | Pryor | |
| 5,445,169 A | 8/1995 | Brinkley et al. | |

(Continued)

*Primary Examiner* — Richard Crispino
*Assistant Examiner* — Phu Nguyen
(74) *Attorney, Agent, or Firm* — Womble Carlyle Sandridge & Rice, LLP

(57) ABSTRACT

A cutting apparatus and an associated method for slitting a tobacco sheet material into cut pieces used to form smoking articles are provided. The cutting apparatus includes a rotatable cutter assembly having a drum member configured to rotate about an axis defined thereby. The cutter assembly includes a plurality of knife members disposed about the periphery of the drum member and extending radially therefrom. A fixed counter-knife assembly is disposed adjacent to the periphery of the drum member and is configured to interact with the rotatable cutter assembly during rotation thereof about the axis. The counter-knife assembly includes a ledger member having a plurality of cutting insert members removably engaged therewith. The cutting insert members are configured to interact with the knife members during rotation of the cutter assembly with respect to the counter-knife assembly so as to slit the tobacco sheet material received therebetween into cut pieces.

10 Claims, 10 Drawing Sheets

(56) References Cited

U.S. PATENT DOCUMENTS

| | | |
|---|---|---|
| 5,501,237 A | 3/1996 | Young et al. |
| 5,533,530 A | 7/1996 | Young et al. |
| 6,094,795 A * | 8/2000 | Davenport ................ 29/407.1 |
| 6,837,453 B2 * | 1/2005 | Sturm ........................ 241/243 |
| 2005/0217447 A1 | 10/2005 | Hollandsworth et al. |

* cited by examiner

SHEET MATERIAL CUTTING APPARATUS

FIELD OF THE INVENTION

The present invention relates to products made or derived from tobacco, or that otherwise incorporate tobacco, and are intended for human consumption. Aspects of the present disclosure are directed to devices for slitting sheet material and, more particularly, to an apparatus and an associated method for cutting a sheet material for use in the manufacture of tobacco products such as cigarettes.

DESCRIPTION OF RELATED ART

Smoking articles, such as cigarettes, typically have a substantially cylindrical structure and include a charge, roll or column of smokable material such as shredded tobacco surrounded by a paper wrapper, thereby forming a tobacco rod.

The roll or column of tobacco used to fill the tobacco rod used in the manufacture of cigarettes may be cut from reconstituted tobacco sheet (such as, for example, R.J. Reynolds Tobacco Company so-called G-7 reconstituted tobacco sheet). Representative methods for making certain types of reconstituted tobacco sheet using papermaking-type processes are set forth, for example, in U.S. Pat. No. 3,847,164 to Mattina; U.S. Pat. No. 4,131,117 to Kite et al.; U.S. Pat. No. 4,182,349 to Selke; U.S. Pat. No. 4,308,877 to Mattina; U.S. Pat. No. 4,341,228 to Keritsis; U.S. Pat. No. 4,421,126 to Gellatly; U.S. Pat. No. 4,706,692 to Gellatly; U.S. Pat. No. 4,941,484 to Clapp et al.; U.S. Pat. No. 4,962,774 to Thomasson et al.; U.S. Pat. No. 4,987,906 to Young et al.; U.S. Pat. No. 5,056,537 to Brown et al.; U.S. Pat. No. 5,143,097 to Sohn et al.; U.S. Pat. No. 5,322,076 to Brinkley et al.; U.S. Pat. No. 5,325,877 to Young et al.; U.S. Pat. No. 5,377,698 to Litzinger; U.S. Pat. No. 5,445,169 to Brinkley et al.; U.S. Pat. No. 5,501,237 to Young et al.; and U.S. Pat. No. 5,533,530 to Young et al.; which are incorporated herein by reference.

In one representative process, the tobacco sheet, once formed from the tobacco pulp material, is then dried to about 12% moisture and has a temperature slightly greater than ambient before being directed to a downstream slitter device for slitting the sheet into ribbons of various widths such as, for example, on the order of about 1-3 inches wide. In some instances, the tobacco sheet, such as, for example, a G-7 reconstituted tobacco sheet, is about 85 inches wide (with standard thickness and basis weight of a reconstituted tobacco sheet) and is directed to travel at about 400 feet/minute in a machine direction to the slitter device.

Some slitter devices used in the production of tobacco products may have one or more rotating shafts, extending non-parallel to the machine direction, with blades or knives attached thereto at lateral intervals corresponding to the desired width of the ribbons that are to be cut from the sheet material, such as that disclosed by U.S. Patent Application Publication No. 2005/0217447 to Hollandsworth et al., which is hereby incorporated herein by reference. In multi-shaft slitters, first and second shafts are generally mounted in close proximity and have substantially parallel rotational axes. In these devices, the blades attached to the first shaft are configured to interact with the second shaft and/or complementary blades attached to the second shaft. This configuration provides a precise shearing cut of the sheet material as it is directed through the slitter between the parallel rotating shafts. A two-shaft, complementary-blade arrangement has been described, for example, in U.S. Pat. No. 4,449,540 to Marshall et al., wherein a slitter-type machine is disclosed for cutting baled tobacco. According to the '540 patent, complementary circular blades or discs on parallel shafts provide a shearing action to cut baled tobacco into sections of a specified width.

In addition, U.S. Pat. No. 4,566,470 to Brackman discloses the general use of closely-spaced counter-rotating discs to shred fibrous tobacco stem material to produce tobacco material suitable for use in cigarette production. Additionally, U.S. Pat. No. 5,445,054 to Pryor generally discloses the use of a tobacco sheet cutting apparatus having a fixed ledger blade, and a rotatable cutter blade co-acting with the ledger blade, to simultaneously cut a tobacco sheet into slit pieces used for cut filler in a cigarette making process. Yet another system for slitting reconstituted tobacco sheet material is set forth in U.S. Pat. No. 5,025,814 to Raker.

In any instance, after repeated contact with the sheet material and the various components and/or other material therein, such as plant stem material, and other relatively harder particles, including soil and mineral components, the blades may begin to wear. Blade wear may occur in a non-uniform manner such that, in some instances, certain blades may exhibit more wear than other blades. This wear can result in deterioration of slitter performance, since the complementary blades become "dulled" and can no longer provide the necessary "sharp" cutting action to cleanly cut the sheet material.

Some tobacco cutting machines disclosed in the prior art, such as in U.S. Pat. No. 3,320,991 to Molins, provide a self-adjusting sharpening mechanism built into the machine for periodic re-sharpening of a collection of cutting blades attached to a single cutting drum. Another single shaft tobacco cutting machine is disclosed in U.S. Pat. No. 3,322,175 to Ward, wherein a clamp for providing a consistent clamping force on cutting knives affixed to a single rotating drum is disclosed.

In some previous slitter machines, realignment of complementary slitter blades into an appropriate cutting relation may require dismantling of all or part of the slitter machine. Such a process includes, for example, removal of the ledger bar section and realignment thereof in order to bring the blades on the ledger bar section into the appropriate cutting/shearing positions relative to complementary blades on the rotatable cutter blade. Such a dismantling and realignment process may be disadvantageous due to the labor-intensive nature of the process and resulting machine down time. In some instances, less than optimal alignment of the blades upon reassembly may undesirably necessitate one or more iterations of the realignment process.

Thus, there exists a need for a cutting apparatus capable of compensating for blade wear without the associated disadvantages of exemplary prior art slitter devices.

BRIEF SUMMARY OF THE INVENTION

The above and other needs are met by embodiments of the present invention, which, according to one aspect, provides a cutting apparatus for slitting a tobacco sheet material into cut pieces used to form smoking articles. The cutting apparatus comprises a rotatable cutter assembly having a drum member configured to rotate about an axis defined thereby. The cutter assembly has a plurality of knife members disposed about the periphery of the drum member and extending radially therefrom. A fixed counter-knife assembly is disposed adjacent to the periphery of the drum member and is configured to interact with the rotatable cutter assembly during rotation thereof about the axis. The counter-knife assembly includes a ledger member having a plurality of cutting insert members removably engaged therewith. The cutting insert members are configured to interact with the knife members during rotation of the cutter assembly with respect to the counter-knife assembly so as to slit the tobacco sheet material received therebetween into cut pieces.

Another aspect provides a method for slitting a tobacco sheet material into cut pieces used to form smoking articles. Such a method comprises receiving a tobacco sheet material in a cutting apparatus comprising a rotatable cutter assembly and a fixed counter-knife assembly. The cutter assembly has a drum member and a plurality of knife members disposed about the periphery of the drum member and extending radially therefrom. The counter-knife assembly is disposed adjacent to the periphery of the drum member and includes a ledger member having a plurality of cutting insert members removably engaged therewith. The method further comprises rotating the drum member of the cutter assembly about an axis defined thereby and with respect to the counter-knife assembly such that the knife members of the cutter assembly interact with the cutting insert members of the counter-knife assembly to slit the tobacco sheet material into cut pieces.

Aspects of the present invention thus provide significant advantages as otherwise detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
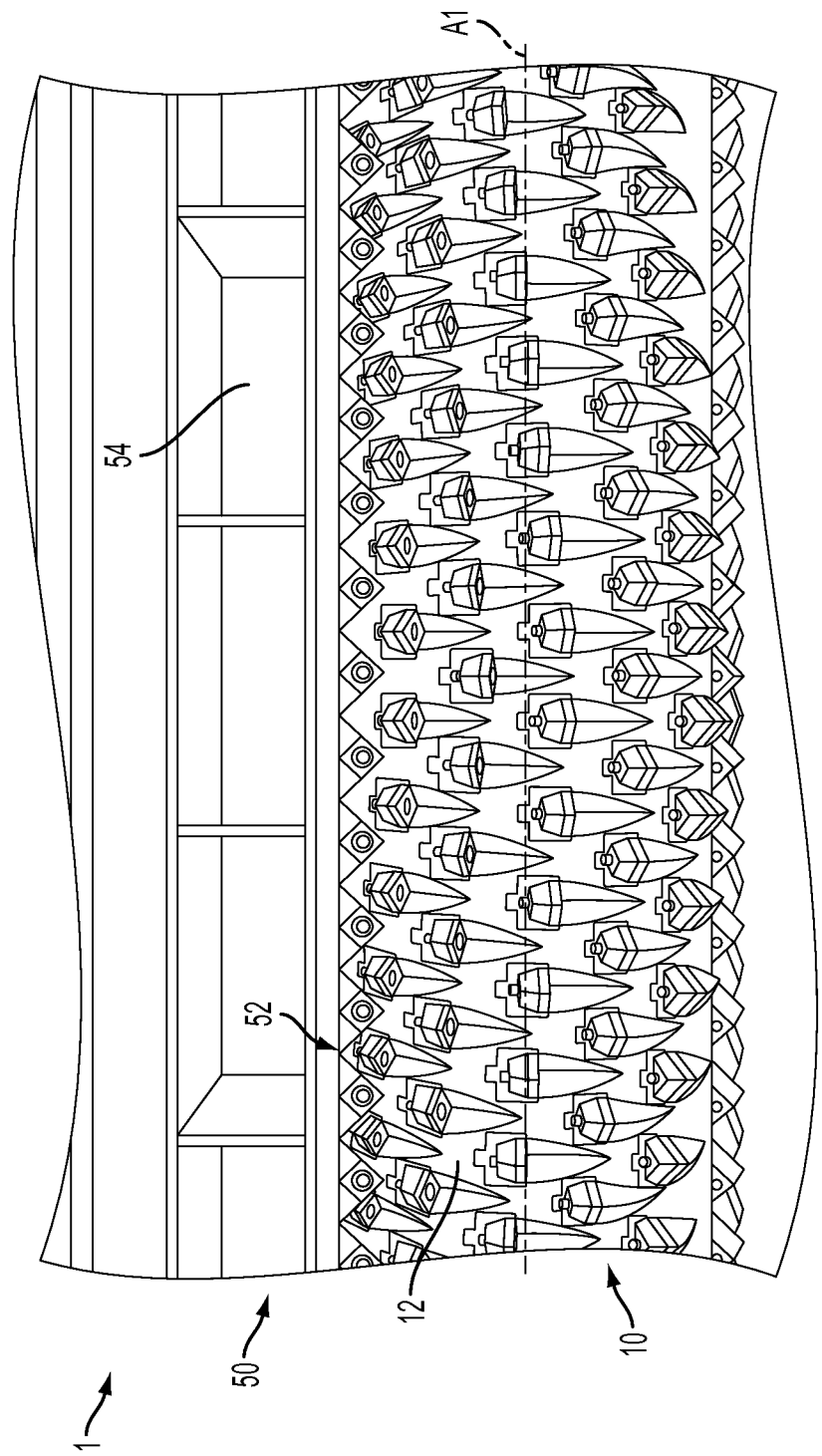
FIG. 1 shows a perspective view of a cutting apparatus according to one embodiment of the present invention.
Figure 2:
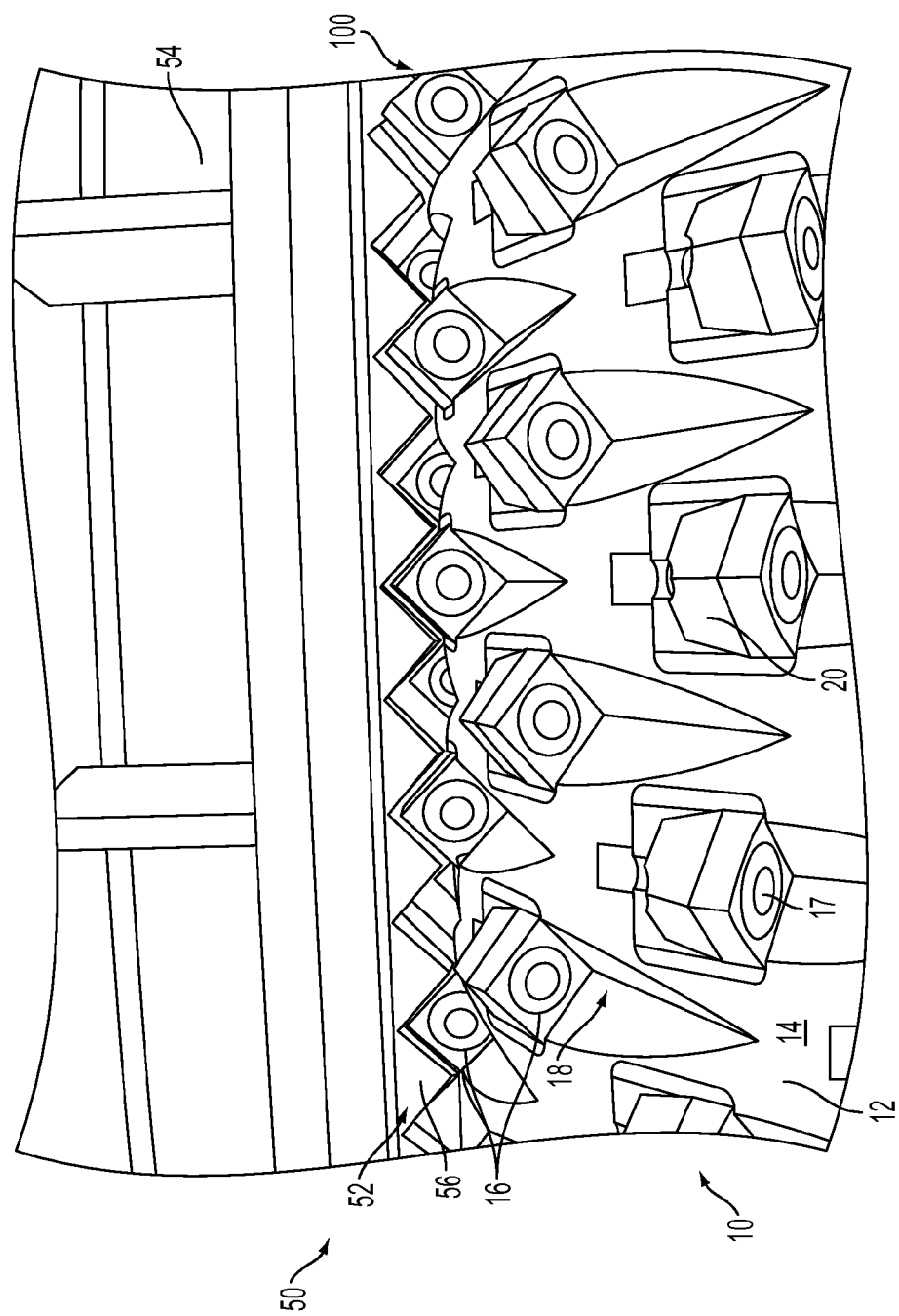
FIGS. 2 and 3 show magnified views of the cutting apparatus of FIG. 1.
Figure 3:
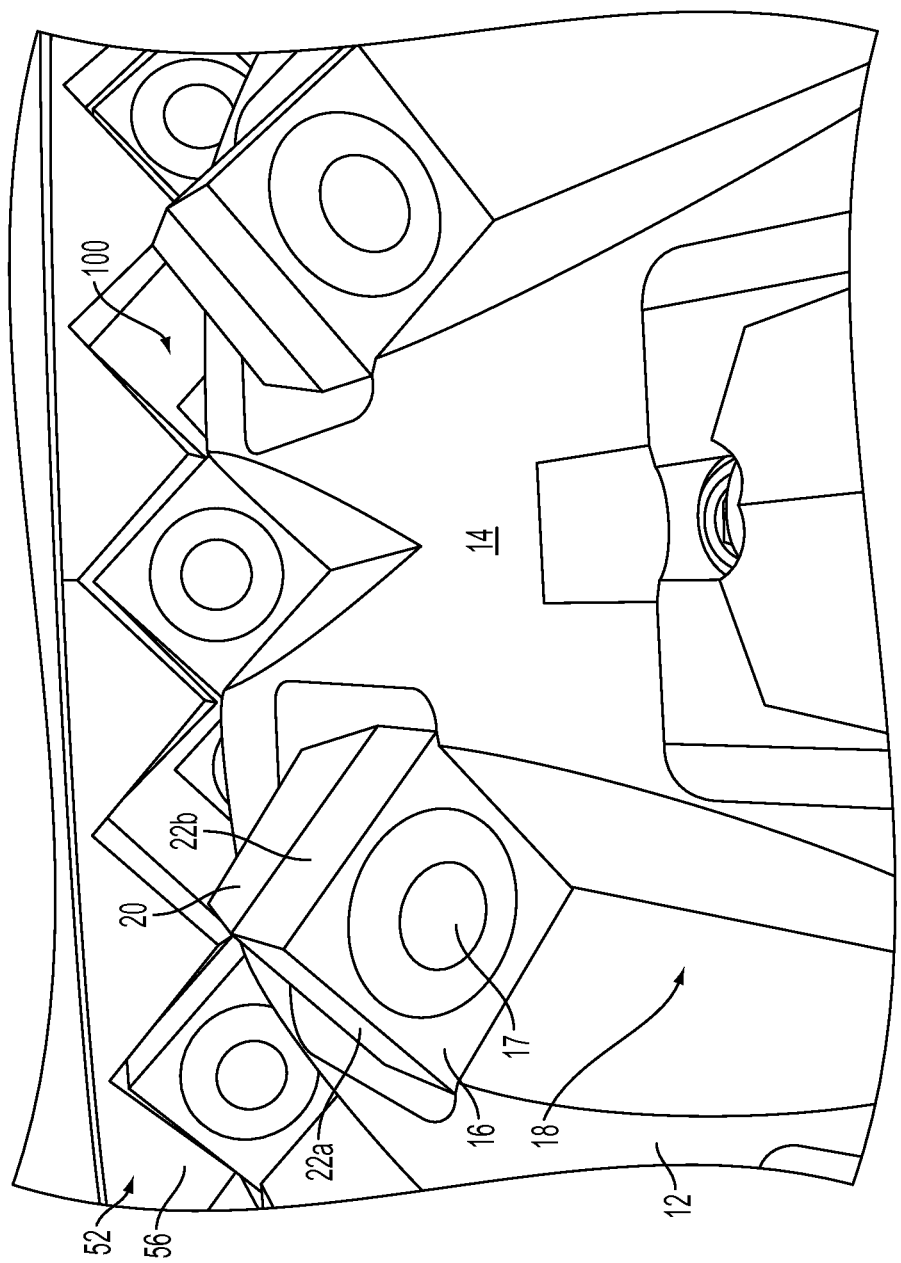

FIGS. 1-3 show one embodiment of a cutting apparatus 1 according to the present invention. Only portions of the cutting apparatus 1 are shown in FIGS. 1-3 for illustrating the relevant aspects of the present invention, and one skilled in the art will appreciate that other components of the apparatuses and methods, such as drive and control provisions for the rotatable elements and the like are necessary for operation of the cutting apparatus, and are thus considered to be within the spirit and scope of the present disclosure even if not explicitly discussed. Cutting apparatus 1 comprises a rotatable cutter assembly 10 and a fixed counter-knife assembly 50 for cutting a sheet material, such as reconstituted tobacco sheet or the like, advanced therebetween in a machine direction by a feed roller (not shown).

A representative cutter apparatus that can be modified in accordance with the present invention is commercially available from WEIMA America Inc. For example, such a cutter apparatus available from WEIMA America Inc. can be its High Powered Shredders having the so called "V-Rotor" turning cutters. Operation of such cutters would be apparent to one skilled in the art. See also, U.S. Pat. No. 6,588,688, which is hereby incorporated herein by reference.

In one aspect, the rotatable cutter assembly 10 comprises a generally cylindrical drum member 12 configured to rotate about an axis A1 defined thereby. The drum member 12 may have an outer or peripheral surface 14 (also referred to herein as the "periphery") forming part of the cylindrical surface of the cutter assembly 10. The cutter assembly 10 may include a plurality of knife members 16 disposed about the peripheral surface 14 of the drum member 12 and extending radially therefrom. In this regard, the knife members 16 may be rotated about the axis A1 which is disposed parallel to the face of the tobacco sheet material being cut. In one embodiment, the peripheral surface 14 of the drum member 12 may be machined to provide a series of spaced-apart recesses or channels 18 into each of which may be received one of the knife members 16. Further, the drum member 12 may include or otherwise define a stop portion 20 associated with each channel 18 to which the knife member 16 may be abutted for maintaining the knife member 16 in position during the tobacco slitting process. The knife members 16 may be removably engaged with, or fixed, attached or otherwise connected to, the drum member 12 by a securing member 17 or other appropriate fastener/fastening mechanism. In one instance, each knife member 16 may define an aperture extending therethrough medially to the cutting edges, wherein the aperture is configured to receive the securing member 17 therethrough, and wherein the securing member 17 is configured to engage the stop portion 20 to secure the knife member 16 thereto. Accordingly, the knife members 16 may be readily replaced upon wearing of the cutting edges thereof to the point that the slitting of the tobacco sheet is considered unsatisfactory. In some instances, each knife member 16 may be rotated, for example, about the axis defined by the aperture extending through the knife member 16, such that a "clean" (not worn) cutting edge of the knife member 16 may be used, without replacing the entire knife member 16.

Figure 4A:
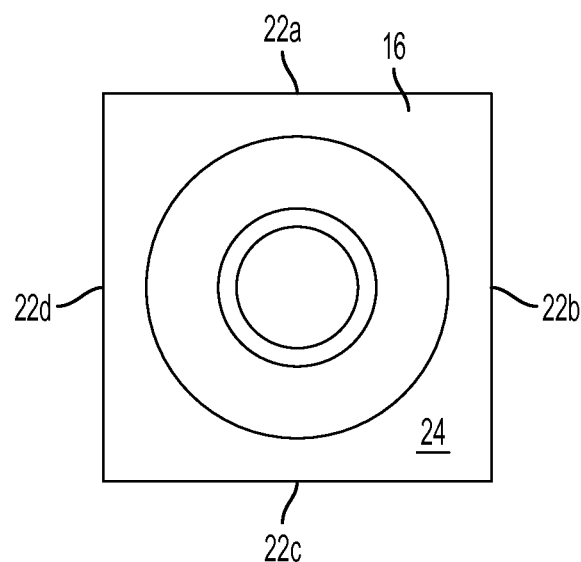
FIG. 4A shows a top view of a knife member capable of being implemented in a rotatable cutter assembly of a cutting apparatus according to one embodiment of the present invention.
Figure 4B:
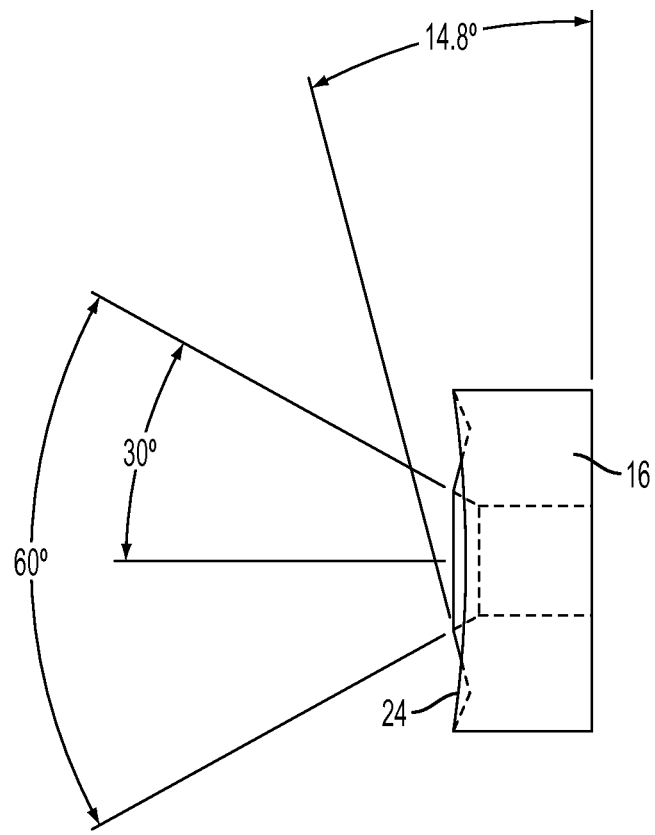
FIG. 4B shows a side view of the knife member of FIG. 4A.

According to one aspect, as shown in FIGS. 4A and 4B, the knife members 16 may be substantially rectangular and configured to include four cutting edges 22a, 22b, 22c, 22d such that when positioned in the channel 18 of the drum member 12, one corner of the knife member 16 projects from the peripheral surface 14 to present multiple cutting edges such as cutting edges 22a, 22b (see FIG. 3). While the profile/shape of each of the knife members 16 depicted in FIGS. 1-4 is substantially rectangular, the knife members 16 may have a variety of profiles/shapes as will be appreciated by one skilled in the art. Such blade profiles/shapes may include, for example, multi-sided polygons, and other shapes suitable for producing the necessary cutting action of the sheet material. In addition, the configuration of the lateral cross-section of the knife members 16 may include various configurations suitable for providing the necessary cutting performance without departing from the spirit of the invention. For example, as shown in FIG. 4B, the face 24 of the knife member 16 interacting with the sheet material may include a concave surface facing in the direction of interaction, for instance, for improving the cutting function of the knife member 16, or extending the service life of the knife member 16

Each knife member 16 may be formed of, for example, a hardened and tempered cold-finished steel alloy, such as AISI E52100, machined/formed D2 tool steel which is then hardened via a cryogenic process, machined/formed D2 tool steel which is then single tempered, or any other material suitable for cutting the sheet material, as will be appreciated by one skilled in the art. One skilled in the art, however, will appreciate that such material selection for each particular component is provided herein for exemplary purposes only, and is not intended to be limiting in any respect for the corresponding component.

With reference to FIGS. 1-3, the fixed counter-knife assembly 50 may be disposed adjacent to the periphery 14 of the drum member 12 for interacting with the cutter assembly 10 during rotation thereof about the axis A1. In some instances, the counter-knife assembly 50 comprises a ledger member 52 which may be mounted or otherwise engaged with a ledger bar 54 such that the counter-knife assembly 50 is positioned and complementarily configured with respect to the cutter assembly 10 for cooperating therewith to slit the tobacco sheet material. The ledger member 52 may comprise a cutting portion 56 complementarily configured and positioned to interact with the knife members 16 of the cutter assembly 10 during rotation thereof with respect to the counter-knife assembly 50 so as to slit the tobacco sheet material received therebetween into, for example, elongate strips or cut pieces used to form cigarettes.

According to one aspect, the cutting portion 56 may be arranged in a serrate configuration (i.e., a sawtooth configuration) extending along an axis parallel with the axis A1 about which the cutter assembly 10 rotates. In this regard, the knife members 16 of the cutter assembly 10 may be correspondingly arranged in a complementary serrate configuration with respect thereto such that the knife members 16 pass in juxtaposition to the cutting portion 56 during rotation of the cutter assembly 10, thereby facilitating a cutting or shearing action for slitting the tobacco sheet material received between the cutter assembly 10 and counter-knife assembly 50 at an interface plane or cutting zone 100. During rotation of the cutter assembly 10, the knife members 16 are positioned with respect to the cutting portion 56 so as to define the cutting zone 100 wherein the knife members 16 and cutting portion 56 form complementary cutting blades that interact to cut the sheet material. In the cutting zone, the knife members 16 rotate about the axis A1 to move into registration with the cutting portion 56 to be immediately adjacent to each other, wherein the movement of the knife members 16 past the cutting portion 56 provides the cutting/slitting action.

In operation, the sheet material is advanced or fed, for example, by a feed roll, toward the cutting zone 100 defined between the cutter assembly 10 and the counter-knife assembly 50, in a substantially perpendicular relation to the axis A1 of the drum member 12. Accordingly, the drum member 12 may be configured to rotate such that the knife members 16 angularly converge toward counter-knife assembly 50 and the sheet material being fed toward the cutting zone 100. The drum member 12 may rotate clockwise with respect to the stationary counter-knife assembly 50. That is, the drum member 12 may rotate the feed direction of the sheet material.

The sheet material may comprise, for example, reconstituted tobacco sheet (such as, for instance, an R.J. Reynolds Tobacco Company so-called G-7 reconstituted tobacco sheet), paper stock, laminate material, or other sheet material. The cooperating interaction of the complementary cutting blades (i.e., the knife members 16 and the cutting portion 56) cuts the sheet material into ribbons having widths determined by the lateral spacing of the knife members 16 with respect to the cutting portion 56, and the configurations thereof. In this manner, embodiments of the present invention may be implemented for cutting a web of sheet material into cut pieces having predetermined lengths and widths.

As mentioned previously, the rotatable cutter assembly 10 may be driven, for example, by appropriate motors and gearing mechanisms, or other drive mechanisms capable of, for instance, adjusting the relative speeds of the drum member 12. One skilled in the art will appreciate that many different types of motors and/or gearing or drive mechanisms, or combinations thereof may be used, as appropriate or desired, to drive the drum member 12 in the manner described herein, wherein such types of motors and/or gearing or drive mechanisms may be, in some instances, independent of the functionality of the cutting apparatus 1 according to various embodiments of the present invention. According to one embodiment, the sheet material is forwarded to the cutting apparatus 1 at about 400-575 feet per minute, and the cutter assembly 10 is configured to rotate at an angular speed of within about ±5% of the linear feed rate of the sheet material. In addition, the cutting apparatus 1 may be fitted with a conveyor belt or other feed mechanism (not shown) for conveying the sheet material toward the cutting zone 100. One skilled in the art will appreciate, however, that other conveyor devices such as, for example, roller drums, may be implemented to feed the sheet material, wherein such conveyor devices may, in some instances, be assisted by vacuum mechanisms or the like for ensuring efficient feeding of the sheet material.

According to various embodiments of the present invention, the ledger member 52 may include a plurality of cutting insert members 60 which form or otherwise may be incorporated into the cutting portion 56 thereof. The cutting insert members 60 may be removably engaged with the ledger member 52 by a securing member 53 (see FIG. 6) or other appropriate fasteners/fastening mechanisms. In one instance, each cutting insert member 60 may define an aperture extending therethrough medially to the cutting edges, wherein the aperture is configured to receive the securing member 53 therethrough, and wherein the securing member 53 is configured to engage the ledger member 52 to secure the cutting insert member 60 thereto. In this manner, the cutting portion 56 of the ledger member 52 may be readily replaced upon wearing of the cutting edges or for other reasons such as, for example, unsatisfactory slitting of the tobacco sheet material. That is, each individual cutting insert member 60 may selectively replaced after the cutting edge(s) have worn to an undesirable level. In some instances, by having the cutting insert member 60 removably engaged with the ledger member 52, the cutting insert members 60 may be individually rearranged, without being replaced. For example, each cutting insert member 60 may be rotated, for instance, about the axis defined by the aperture extending therethrough, such that a "clean" cutting edge may be used, without replacing the entire cutting insert member 60 due to a worn cutting edge. According to some aspects, the cutting insert member 60 may be rotated 180 degrees so as to provide two clean cutting edges. Furthermore, each cutting insert member 60 may be flipped with respect to the ledger member 52. That is, the three-dimensional shape of the cutting insert member 60 provides cutting edges on the forward (front) and rearward (back) opposing sides thereof.

That is, each cutting insert member 60 may be rearranged with respect to the ledger member 52 so as to change the cutting edge of the cutting insert member 60 arranged to interact with the knife members 16 of the counter-knife assembly 50. In this regard, the life of each cutting insert member 60 may be extended and the costs for maintaining the cutting apparatus 1 may be reduced. Accordingly, the cutting portion 56 may be more easily repaired by attending to individual cutting insert members 60 exhibiting less-than-desirable cutting performance, rather than replacing the entire ledger member (i.e., providing an entirely new cutting portion 56).

Figure 5A:
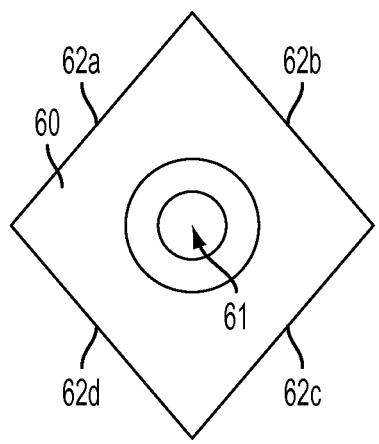
FIG. 5A shows a top view of a cutting insert member capable of being implemented in a cutting apparatus, according to one embodiment of the present invention.
Figure 5B:
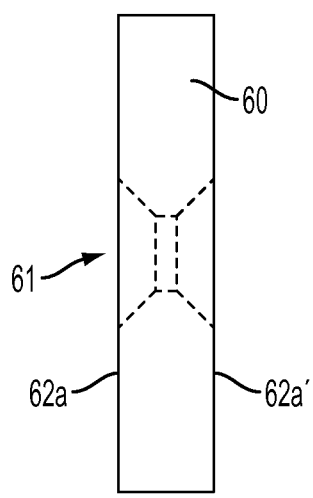
FIG. 5B shows a side view of the cutting insert member of FIG. 5A.

As shown in FIGS. 5A and 5B, according to one embodiment, each cutting insert member 60 may have a plurality of cutting edges 62a, 62b, 62c, 62d configured to interact with the tobacco sheet material in a cutting function. The cutting insert member 60 may define an aperture 61 extending axially therethrough, wherein the aperture 61 is configured to receive a fastening pin (not shown) for fastening the cutting insert member 60 to the ledger member 52. In one aspect, the cutting insert member 60 may be non-rectilinear, such as the diamond shape shown in FIG. 5A. However, the cutting insert members 60 may have a variety of profiles as will be appreciated by one skilled in the art. Such profiles may include, for example, multi-sided polygons, and other shapes suitable for producing the necessary cutting action of sheet material. In addition, the configuration of the lateral cross-section of the cutting insert members 60 may include various configurations suitable for providing the necessary cutting performance without departing from the spirit of the invention.

Each cutting insert member 60 may be formed of, for example, hardened and tempered cold-finished steel alloy, such as AISI E52100, machined/formed D2 tool steel which is then hardened via a cryogenic process, machined/formed D2 tool steel which is then single tempered, or any other material suitable for cutting the sheet material, as will be appreciated by one skilled in the art. One skilled in the art, however, will appreciate that such material selection for each particular component is provided herein for exemplary purposes only, and is not intended to be limiting in any respect for the corresponding component.

After a period of operation, one or more of the cutting insert members 60 may be sufficiently worn such that the cutting configuration, or the space between the cutting insert members 60 and the knife members 16, is no longer maintained. Wear of the edges of the cutting insert members 60 may be caused by, for example, interaction of the cutting insert members 60 with irregular components that make up the sheet material, or interaction of the cutting insert members 60 with the sheet material itself. As a result of blade wear, the effectiveness of the cutting apparatus 1 may be reduced, wherein the cutting insert members 60 may undesirably tear the sheet material rather than cleanly cut/slit the sheet material. Due to the removability of the cutting insert members 60 with respect to the ledger member 52, individual cutting insert members 60 may be readily replaced and/or individually and selectively rotated to extend the life of the cutting insert member 60, while maintaining suitable cutting performance, thereby reducing costs to the cigarette manufacturer. For example, the cutting insert member 60 shown in FIGS. 5A and 5B may be rotated 180 degrees to provide a clean cutting edge due to its diamond shape. Alternatively, or in addition, the cutting insert member 60 may be flipped such that a clean cutting edge 62a' from the backside thereof may replace the worn cutting edge 62a such that the clean cutting edge 62a' may interact with the sheet material.

Figure 7:
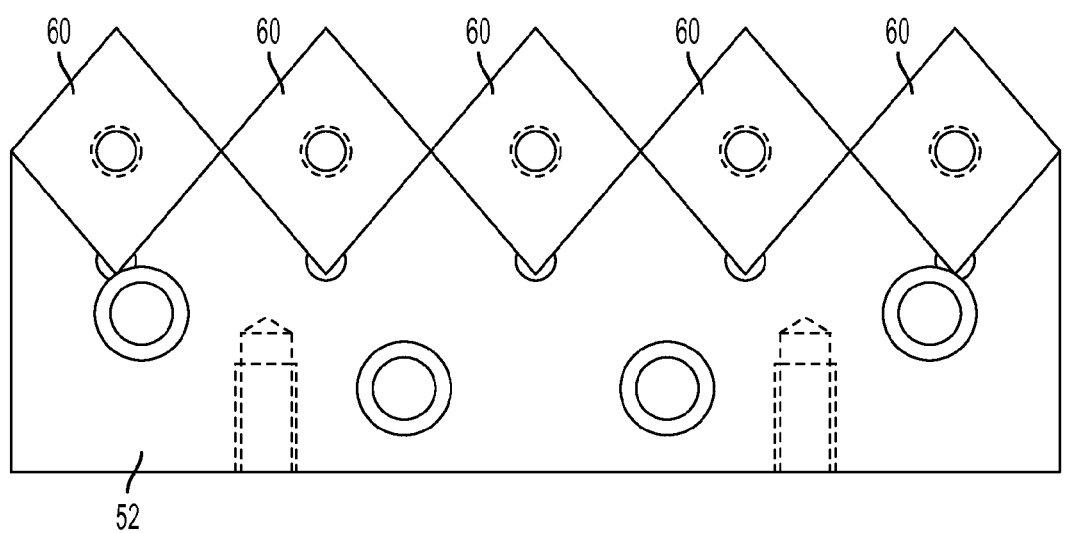
FIG. 7 shows a plan view of a ledger section having a plurality of cutting insert members removably engaged therewith, according to one embodiment of the present invention.
Figure 8:
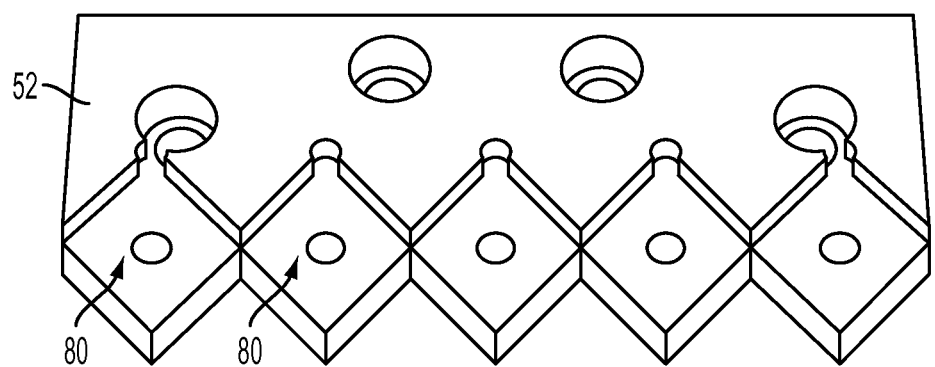
FIG. 8 shows a perspective view of a ledger section configured to receive a plurality of cutting insert members, according to one embodiment of the present invention.
Figure 9:
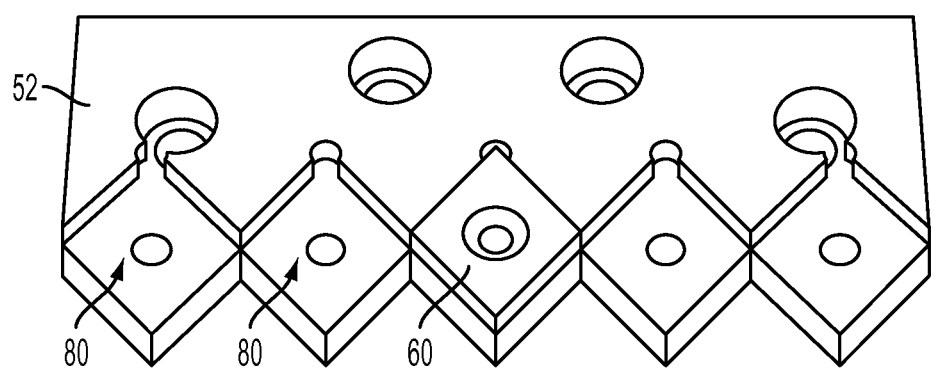
FIG. 9 shows a perspective view of a ledger section having a cutting insert member removably engaged therewith, according to one embodiment of the present invention.

According to other embodiments of the present invention, the ledger member 52 may be configured to receive and securely maintain the cutting insert members 60 therein such that the cutting insert members 60 form the cutting portion 56. For example, as shown in FIGS. 7-9, the ledger member 52 may include or otherwise define one or more seating portions 80 for seating and retaining the cutting insert members 60 such that the cutting insert members 60 may be removably secured thereto. In some instances, the seating portions 80 and the cutting insert members 60 may be correspondingly and complementarily configured such that the cutting insert members 60 are received in a secure manner. For example, as shown in FIG. 9 (for illustrative purposes, only one cutting insert member 60 is shown engaged with the ledger section 52b), the seating portion 80 and the cutting insert member 60 may each have a diamond configuration complementing one another. In this manner, a secure engagement between the ledger section 52b and the cutting insert member 60 may be achieved, for example, to prevent rotation of the cutting insert member 60, with respect to the seating portion 80, about the axis defined by the aperture extending therethrough.

Figure 6A:
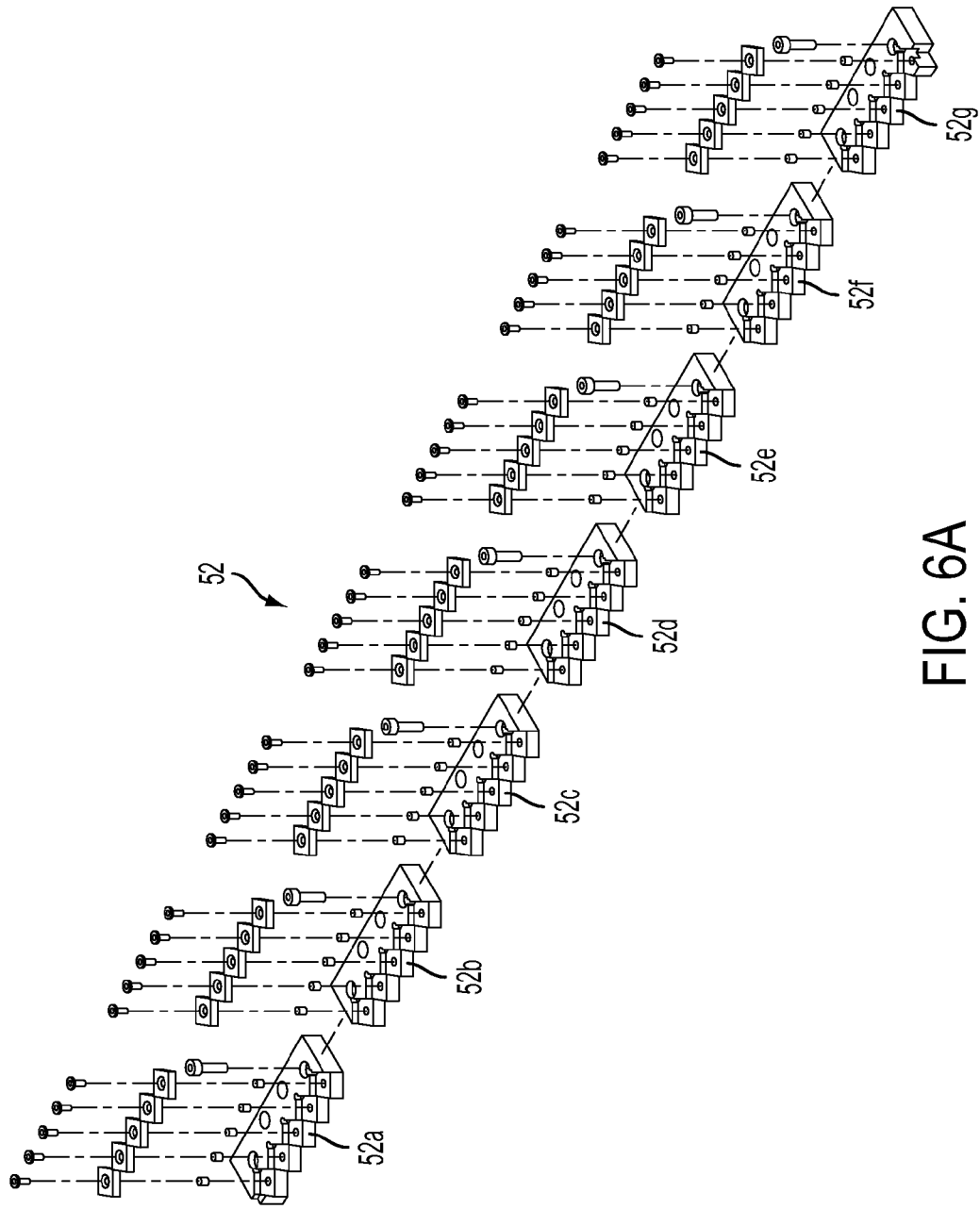
FIG. 6A shows an exploded view of a ledger member having a plurality of cutting insert members, according to one embodiment of the present invention.
Figure 6B:
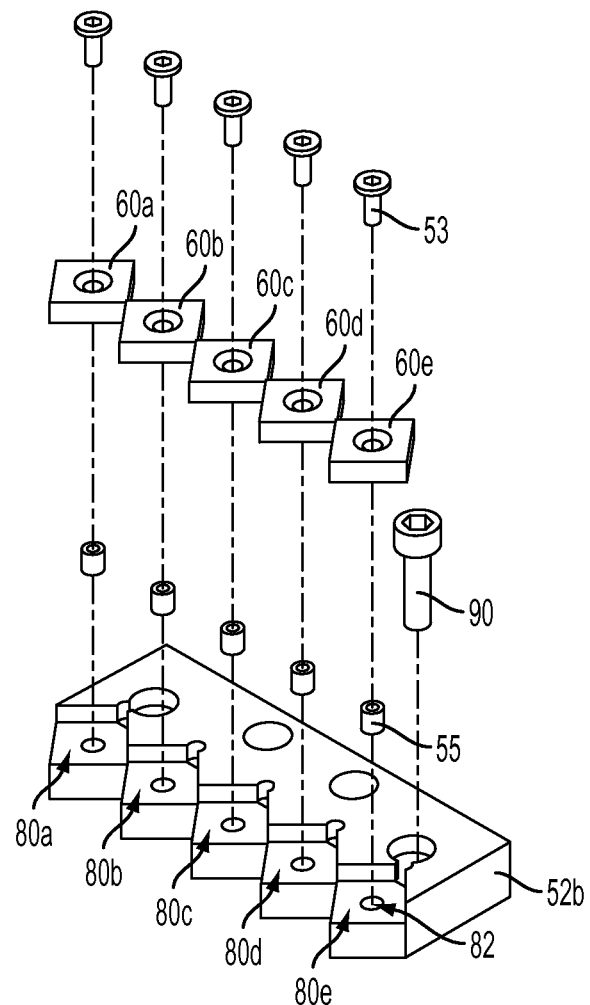
FIG. 6B is a partial and magnified view of the ledger member of FIG. 6A.

In one exemplary embodiment of the present invention, as shown in FIGS. 6A and 6B, the ledger member 52 may be formed from a plurality of ledger sections 52a, 52b, 52c, 52d, 52e, 52f, 52g configured to be adjacently positioned with respect to one another on the ledger bar 54 (FIGS. 1-3) so as to form the continuous cutting portion 56, as formed by the cutting insert members 60 removably engaged with each of the ledger sections 52a, 52b, 52c, 52d, 52e, 52f, 52g. In one particular embodiment, the ledger member 52 may be comprised of seven ledger sections 52a, 52b, 52c, 52d, 52e, 52f, 52g, although any number of ledger sections may be used to form the ledger member 52 and the disclosed configuration is merely an exemplary embodiment. Further, each ledger section 52a, 52b, 52c, 52d, 52e, 52f, 52g may define multiple seating portions 80, such as, for example, the five seating portions 80a, 80b, 80c, 80d, 80e. Each seating portion 80a, 80b, 80c, 80d, 80e may be configured to receive and seat a respective cutting insert member 60a, 60b, 60c, 60d, 60e. A securing member 53 may be configured to extend through each of the cutting insert members 60a, 60b, 60c, 60d, 60e and engage a securing component 55 positioned within a borehole 82 of the ledger section 52b so as to removably secure the cutting insert members 60a, 60b, 60c, 60d, 60e thereto. In addition, an attachment member 90 may be configured to be received through an aperture of each of the ledger sections 52a, 52b, 52c, 52d, 52e, 52f, 52g for securing the ledger sections 52a, 52b, 52c, 52d, 52e, 52f, 52g to the ledger bar 54.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cutting apparatus for slitting a tobacco sheet material into cut pieces used to form smoking articles, the cutting apparatus comprising:
    a rotatable cutter assembly having a drum member configured to rotate about an axis defined thereby, and the rotatable cutter assembly having a plurality of knife members disposed about the periphery of the drum member and extending radially therefrom; and
    a fixed counter-knife assembly disposed adjacent to the periphery of the drum member and configured to interact with the rotatable cutter assembly during rotation thereof about the axis, the counter-knife assembly comprising a ledger member having a plurality of cutting insert members individually removably engaged therewith via a securing member, the cutting insert members being configured to interact with the knife members during rotation of the rotatable cutter assembly with respect to the counter-knife assembly so as to slit the tobacco sheet material received therebetween into cut pieces,
    wherein each of the cutting insert members includes a front side and an opposing back side, a plurality of cutting edges defined at the front side and the opposing back side, and an aperture extending along an axis from the front side to the opposing back side and configured to receive the securing member,
    each of the cutting insert members being configured to be reversed such that one of the front side and the opposing back side cooperates with the knife members, and being configured to be rotated about the axis defined by the aperture extending therethrough to rearrange the cutting edges cooperating with the knife members.

2. An apparatus according to claim 1, wherein the knife members of the rotatable cutter assembly are removably engaged with the drum member and are configured to be at least one of replaceable and rearrangeable with respect to the drum member.

3. An apparatus according to claim 1, wherein the ledger member comprises a plurality of ledger sections, each ledger section having a plurality of cutting insert members individually removably engaged therewith in a serrate configuration.

4. An apparatus according to claim 3, wherein each ledger section comprises a plurality of seating portions, each seating portion being configured to receive and securely maintain the cutting insert members during cutting of the tobacco sheet material thereby.

5. An apparatus according to claim 1, wherein the cutting insert members are configured to be individually removably engaged with the ledger member in a serrate configuration, and the knife members of the rotatable cutter assembly are correspondingly arranged in a complementary serrate configuration with respect thereto such that the knife members pass in juxtaposition to the cutting insert members during rotation of the rotatable cutter assembly.

6. An apparatus according to claim 5, wherein the cutting insert members are polygonal and the ledger member defines a plurality of correspondingly configured seating portions for receiving the cutting insert members.

7. An apparatus according to claim 6, wherein the knife members are polygonal.

8. An apparatus according to claim 1, wherein the cutting edges cooperate to define a polygonal configuration.

9. An apparatus according to claim 8, wherein the ledger member defines a plurality of seating portions, the seating portions respectively defining a polygonal configuration corresponding to and configured to receive the polygonal configuration of the cutting edges of the cutting insert members.

10. An apparatus according to claim 9, wherein one or more pairs of the cutting edges of the cutting insert members respectively extend to a pointed tip, wherein the seating portions of the ledger member are configured to receive the cutting insert members such that the pointed tip of each of the cutting insert members is directed toward the drum member.

* * * * *